United States Patent
Chong et al.

(10) Patent No.: US 12,528,952 B2
(45) Date of Patent: Jan. 20, 2026

(54) SELF-CLEANING COATING COMPOSITION

(71) Applicant: Evonik Operations GmbH, Essen (DE)

(72) Inventors: Yong Bing Chong, Singapore (SG); Kong Chin Chew, Singapore (SG); Jia Wen Hah, Singapore (SG); Madeline Christabel, Singapore (SG)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 18/510,441

(22) Filed: Nov. 15, 2023

(65) Prior Publication Data

US 2024/0166887 A1     May 23, 2024

(30) Foreign Application Priority Data

Nov. 18, 2022 (EP) .................................. 22208237

(51) Int. Cl.
| | | |
|---|---|---|
| *C09D 7/65* | (2018.01) | |
| *C09D 5/16* | (2006.01) | |
| *C09D 5/18* | (2006.01) | |
| *C09D 7/40* | (2018.01) | |
| *C09D 7/62* | (2018.01) | |
| *C09D 129/10* | (2006.01) | |

(52) U.S. Cl.
CPC ............. *C09D 5/1668* (2013.01); *C09D 5/18* (2013.01); *C09D 7/62* (2018.01); *C09D 7/65* (2018.01); *C09D 7/67* (2018.01); *C09D 7/68* (2018.01); *C09D 129/10* (2013.01)

(58) Field of Classification Search
CPC .......... C09D 5/1668; C09D 7/62; C09D 7/65; C09D 7/67; C09D 7/68; C09D 129/10; C09D 7/20; C09D 7/69; C09D 7/61; C09D 5/1681; C09D 127/14; C09D 4/00; C09D 5/18; C08K 9/06; C08K 3/22; C08K 2003/2241; C08K 2201/011; C08L 27/16

USPC ....................................................... 524/430
See application file for complete search history.

(56) References Cited

U.S. PATENT DOCUMENTS

| | | | |
|---|---|---|---|
| 8,202,614 B2 | 6/2012 | Koene et al. | |
| 9,388,325 B2 | 7/2016 | Jones et al. | |
| 2003/0175347 A1* | 9/2003 | Steffier ..................... | A61Q 3/02 424/468 |
| 2008/0250978 A1* | 10/2008 | Baumgart .............. | C09D 5/008 106/287.18 |
| 2009/0297839 A1* | 12/2009 | Jin ........................ | C09D 183/06 524/588 |
| 2009/0298369 A1 | 12/2009 | Koene et al. | |
| 2011/0184088 A1 | 7/2011 | Lohmeijer et al. | |
| 2014/0364537 A1* | 12/2014 | Li ......................... | C09D 151/08 523/400 |
| 2020/0087520 A1* | 3/2020 | Hebrink ................ | A01N 59/16 |
| 2021/0070938 A1 | 3/2021 | Farrugia et al. | |
| 2021/0070993 A1 | 3/2021 | Farrugia et al. | |

OTHER PUBLICATIONS

Extended Search Report received for European Patent Application No. 22208237.2, issued on May 2, 2023, 7 pages.

* cited by examiner

*Primary Examiner* — Hannah J Pak
(74) *Attorney, Agent, or Firm* — Grüneberg and Myers PLLC

(57) ABSTRACT

A coating composition has 5-15% by weight of a polymeric binder selected from a polyester polyol, an acrylic polyol, an epoxy, silicone, a silicone hybrid and a fluoropolymer. The composition has 20-40% by weight of microparticles, where the microparticles are made of a polyamide, a polyethylene, a polypropylene, a polyurea, a polyurethane, a polymethyl methacrylate, a polystyrene or mixtures thereof and the microparticles have a mean particle diameter $d_{50}$ size ranging from 5 μm to 60 μm. The composition has 2-12% by weight of nanoparticles, said nanoparticles are made of inorganic oxides with a primary particle size ranging from 5 nm to 50 nm; 0-15% by weight of a crosslinker having reactivity to the polymeric binder; 0-20% by weight of pigments and/or fillers, and 40-80% by weight of an organic solvent.

19 Claims, No Drawings

SELF-CLEANING COATING COMPOSITION

CROSS-REFERENCE TO RELATED APPLICATIONS

This application claims priority to European Application No. 22208237.2 fled on Nov. 18, 2022, the content of which is hereby incorporated by reference in its entirety.

BACKGROUND OF THE INVENTION

Field of the Invention

This invention pertains to self-cleaning coating compositions comprising micro- and nano-sized particles.

Description of Related Art

Coatings refer to a layer or film used to protect an underlying substrate and to impact different functionalities such as corrosion resistance, decorations and/or easy-to-clean. Coatings are widely used in different industries and can be applied via different methods including brush, spray, dip, and roller coatings.

The term "Coil coating" refers to a coating on a metal sheet applied through a continuous roller coating process. The col coating process requires a high temperature baking process above 200° C. (peak metal temperature) and a short baking duration (usually less than 60 seconds). The coated metal substrate will then be formed into the final dimension and shape required by different industrial or household applications.

U.S. Pat. No. 9,388,325 discloses elastomeric coatings having hydrophobic and/or oleophobic properties to create highly durable superhydrophobic, oleophobic surfaces that can provide resistance to ice formation and can be nearly transparent. The coating system comprises of two different components. The first elastomeric component comprises one or more styrenic block copolymer and particles having a size of about 30 µm to about 225 µm (0.01-5% by weight). The second component comprises particles having a size of about 1 nm to about 200 nm, comprised of metal oxide, silicate, an oxide of a metalloid which is treated with one or more silanizing agents. The first elastomeric component can be applied to form a base coating and the second component imparts the coating's hydrophobicity and oleophobicity. The second component is applied to the base coating when it is wet, tacky, dry to touch, or even completely dried and cured. The combination of the two components in the coating system results in a superhydrophobic surface. Since the base coat comprises an elastomeric coating there is a chance that the taber abrasion properties of the entire coating system are poor. The requirement of the two coating systems/layers introduces additional steps and processes, which is not ideal for many applications.

U.S. Pat. No. 8,202,614 pertains to additive particles having superhydrophobic characteristics and coatings and methods of making and using the same. By incorporating a sufficient amount of these additive particles into the coating, a versatile superhydrophobic coating suitable for all substrates can be created. Additive particles are incorporated into the coating material in an amount about 5-20% by weight based on the total weight of both the additive particles and the coating material. The coating polymeric material is selected from thermoplastic polymers, thermoset polymers, and curable polymers such as polyurethane and commercial epoxy paint. Incorporating the additive particles into the final coating formulation is done by direct blending of the additive particles into commercially available coating materials. Alternatively, the additive particles are applied onto the top surface of the coating after about 2 minutes of casting the coating onto a surface and before complete curing occurs. Two methods are disclosed to produce the additive particles having dual morphology. First, the additive particles are produced by reacting amino functionalized silica nanoparticles with epoxy functionalized silica microparticles. Second, anionic silica nanoparticles were deposited onto a cationic micron sized silica carrier particle e.g. ammonium functionalized silica. Upon mixing the additive particles into coating formulation, they are expected to be mostly concentrated on the exposed surface of the coating. By using hollow particles with lower density as compared to the solid particles, more microparticles can migrate to the surface when the formulation is being coated on the substrate. U.S. Pat. No. 8,202,614 mainly focuses on the synthesis of dual morphology additive particles and how such particles contribute to the high water contact angle of a coating containing these particles. Due to the size of the dual morphology particles the cured coating has a rough morphology which can be easily damaged. The synthesis of dual morphology particles requires a multiple step process. While self-cleaning properties are achieved the coating is not durable. In addition, the multiple step process to produce the dual morphology particles may increase the cost of the final formulation. The size of the commercially available hollow silica microparticles is too big for many applications, such as exterior architectural coil coating.

The prior art focuses on creating a structural surface through structural particles or multiple coating layers with different particles. The main disadvantage of the prior art is that it necessitates additional process or coating steps which can increase the overall cost of these formulations. Moreover, a high water contact angle and/or hydrophobic properties are achieved by a rough morphology and it is known in the art that rough morphology causes low robustness.

SUMMARY OF THE INVENTION

It is therefore an object of the present invention to provide a coating composition with self-cleaning properties in which the disadvantages of prior art coatings are at least reduced, that has good robustness, is easy to use and does not require multiple coating steps.

This object is achieved with a coating composition comprising:
- a) 5-15% weight of a polymeric binder selected from the group consisting of polyester polyol, acrylic polyol, epoxy, silicone, silicone hybrid and fluoropolymer.
- b) 20-40% weight of microparticles, said microparticles are made of polyamide, polyethylene, polypropylene, polyurea, polyurethane, polymethyl methacrylate, polystyrene or mixtures thereof and said microparticles having a mean particle diameter $d_{50}$ size ranging from 5 µm to 60 µm.
- c) 2-12% weight of nanoparticles, said nanoparticles are made of inorganic oxides with a primary particle size ranging from 5 nm to 50 nm.
- d) 0-15% weight of a crosslinker having reactivity to component a).
- e) 0-20% weight or pigments and/or fillers.
- f) 40-60% weight organic solvent.

The weight percentage of components a) to e) refers to the solid content of those components without any solvent.

The sum of components a) to f) of the composition equals 100% weight.

The mean particle diameter $d_{50}$ is determined according to ISO 13320-1.

The primary particle size of the nanoparticles is determined according to ISO 21383. The primary particle size refers to the nanoparticles as such and not to agglomerated nanoparticles.

DETAILED DESCRIPTION OF THE INVENTION

The term "silicone hybrid" binder means a polymeric binder containing silicone and another polymer e.g. silicone epoxy, silicone polyester or silicone acrylic.

Surprisingly, the combined use of polymeric microparticles and inorganic nanoparticles not only attains self-cleaning properties in a single coating step but also retains scratch resistance and chemical resistance as compared with coatings not comprising microparticles and nanoparticles.

It Is important to note that the polymeric microparticles and the inorganic nanoparticles are present in the coating composition separately i.e. as separate ingredients and not as a composite produced e.g. from a melt of the polymer to which inorganic oxide nanoparticles are added.

Each type of particle is dispersed separately in the coating composition according to the invention which creates a surprising synergistic effect of self-cleaning properties.

The inventive use of discrete micro- and nano particles creates a unique structural surface with a distinctive roughness that produces not only a water repellent layer on which dirt can be easily washed off but also excellent mechanical and chemical resistance properties.

Preferably component a) in the coating composition according to the invention is selected from the group consisting of silicone, silicone hybrid and fluoropolymer. More preferably component a) in the coating composition according to the invention is a fluoropolymer selected from the group consisting of fluoroethylene vinyl ether (FEVE) and polyvinylidene fluoride (PVDF).

Preferably component b) of the coating composition according to the invention are microparticles made of polyamide or polymethyl methacrylate. Most preferably component b) of the coating composition according to the invention are microparticles made of polyamide.

Unexpectedly it was found that the chemical resistance properties against solvents such as methyl ethyl ketone (MEK) which are typically used for col coatings were significantly enhanced when the coating composition according to the invention contained microparticles made of polyamide.

In another preferred embodiment of component b) the microparticles have a mean particle diameter $d_{50}$ size ranging from 5 μm to 60 μm. More preferably the mean particle diameter $d_{50}$ of the microparticles used for the coating composition according to the invention ranges from 5 μm to 40 μm.

Component c) are nanoparticles made of inorganic oxides. Preferred nanoparticles are selected from $SiO_2$, $Al_2O_3$, MgO, $ZrO_2$ or ZnO. Most preferably the nanoparticles are made of $SiO_2$.

In another preferred embodiment of the coating composition according to the invention the nanoparticles are surface treated with a hydrophobic material selected from polysiloxane, alkyl silanes or fluorinated alkyl silane. The alkyl silanes or fluorinated alkyl silane preferably comprising 1 to 40 carbon atoms. More preferably the nanoparticles of component c) are surface treated with a hydrophobic material selected from the group consisting or polydimethysiloxane, dimethylchlorosilane, hexamethyldisilazane, octyltrimethoxysilane and hexadecyltrimethoxysilane.

Thus, the coating composition according to the invention preferably comprises:
a) 5-15% weight of a polymeric binder selected from the group consisting of polyester polyol, acrylic polyol, epoxy, silicone, silicone hybrid and fluoropolymer.
b) 20-40% weight of microparticles, said microparticles are made of polyamide, polyethylene, polypropylene, polyurea, polyurethane, polymethyl methacrylate, polystyrene or mixtures thereof and said microparticles having a mean particle diameter $d_{50}$ size ranging from 5 μm to 60 μm.
c) 2-12% weight or nanoparticles, said nanoparticles are selected from $SiO_2$, $Al_2O_3$, MgO, $ZrO_2$, or ZnO with a primary particle size ranging from 5 nm to 50 nm and the nanoparticles are surface treated with a hydrophobic material selected from polysiloxane, alkyl silanes or fluorinated alkyl silane.
d) 0-15% weight of a crosslinker having reactivity to component a).
e) 0-20% weight of pigments and/or fillers.
f) 40-60% weight organic solvent.

The weight percentage of components a) to e) refers to the solid content of those components without any solvent and the sum of components a) to f) of the composition equals 100% weight.

Preferably the composition according to the invention comprises 2-10% weight of nanoparticles, 2-8% weight of nanoparticles, 2-7% weight or nanoparticles or most preferably 2-8% weight of nanoparticles. The weight ratio of microparticles to nanoparticles preferably lies in the range of 15:1 to 3:1, more preferably in the range of 12:1 to 3:1 and most preferably in the range of 10:1 to 3:1.

Component d) of the composition according to the invention is a crosslinker having reactivity to component a). Component d) is an optional component as some polymeric binders do not require a crosslinker e.g. PVDF. Component d) is preferably selected from amine, melamine and a blocked isocyanate. Isocyanate can be blocked with chemistries including methylethylketoxime, acetoneoxime, dimethylmalonate or caprolactam. Most preferably the crosslinker is a blocked isocyanate. The molar ratio of crosslinker/binder is preferably in the range of 0.8-1.3 equivalents of reactive groups or the crosslinker relative to reactive groups in the binder.

Component e) of the composition according to the invention are pigments and/or fillers. Such pigments and/or fillers can be titanium dioxide, calcium carbonate, talc, kaolin, barium sulphate and other metal oxides depending on the color requirements of the formulated coating. The pigments and fillers can also be in the form of particles but such pigments or fillers are not nanoparticles and are therefore different from component c). Pigments and fillers may be microparticles but such microparticles are not polymers and are therefore different from component b).

Component f) of the composition according to the invention is an organic solvent or a mixture of organic solvents including both oxygenated and hydrocarbon solvents, whichever is suitable for the final coating formulations. Examples or suitable organic solvents are naphtha, alkyl benzene, isophorone, cyclohexanone or glycol ether.

Preferably the coating composition according to the invention is a coil coating composition and component a) Is selected from the group consisting of fluoroethylene vinyl ether (FEVE) and polyvinylidene fluoride (PVDF).

The coating composition according to the present invention provides a completely new technology for the coil coating industry to solve poor dirt-pick-up properties. Surprisingly the present invention functions not only with hydrophobic coating compositions but also with hydrophilic coating compositions.

The coil coating composition according to the invention preferably comprises:
- a) 5-15% weight of a polymeric binder selected from the group consisting of fluoroethylene vinyl ether (FEVE) and polyvinylidene fluoride (PVDF).
- b) 20-40% weight of microparticles, said microparticles are made of polyamide, polymethyl methacrylate or mixtures thereof and said microparticles having a mean particle diameter $d_{50}$ size ranging from 5 μm to 60 μm.
- c) 2-12% weight of nanoparticles, said nanoparticles are selected from $SiO_2$, $Al_2O_3$, MgO, $ZrO_2$, or ZnO with a primary particle size ranging from 5 nm to 50 nm and the nanoparticles are surface treated with a hydrophobic material selected from polysiloxane, alkyl silanes or fluorinated alkyl silane.
- d) 0-15% weight of a crosslinker having reactivity to component a).
- e) 0-20% weight of pigments and/or filers.
- f) 40-60% weight organic solvent.

The weight percentage of components a) to e) refers to the solid content of those components without any solvent and the sum of components a) to f) of the composition equals 100% weight.

There is no known satisfactory self-cleaning coil coating system at the high-end fluoropolymer segment mainly for exterior architectural applications even though such coating systems are sold at a premium price and have good weatherability. The col coating composition according to the invention can provide such a self-cleaning coil coating system by incorporating microparticles and nanoparticles into a fluoropolymer binder system. The application of the coil coating composition according to the invention is done in a one step process and it renders the metal co with excellent self-cleaning properties.

The coil coating composition according to invention is preferably characterized in that component a) is selected from the group consisting of fluoroethylene vinyl ether (FEVE) and polyvinylidene fluoride (PVDF), component b) is made of polyamide or polymethyl methacrylate, component c) is made of $SiO_2$ or $ZrO_2$ surface treated with polysiloxane and component d) is a blocked isocyanate. The coil coating composition according to the invention preferably comprises:
- a) 5-15% weight of a polymeric binder selected from the group consisting of consisting of fluoroethylene vinyl ether (FEVE) and polyvinylidene fluoride (PVDF).
- b) 20-40% weight of microparticles, said microparticles are made of polyamide, or polymethyl methacrylate and said microparticles having a mean particle diameter $d_{50}$ size ranging from 5 μm to 60 μm.
- c) 2-12% weight of nanoparticles, said nanoparticles are selected from $SiO_2$ or $ZrO_2$ with a primary particle size ranging from 5 nm to 50 nm and the nanoparticles are surface treated with polysiloxane.
- d) 0-15% weight of a crosslinker having reactivity to component a) and selected from blocked isocyanate.
- e) 0-20% weight of pigments and/or fillers.
- f) 40-0% weight organic solvent.

The weight percentage of components a) to e) refers to the solid content of those components without any solvent and the sum of components a) to f) of the composition equals 100% weight.

The coil coating composition according to the invention can be used to coat metal cols at a peak metal temperature (PMT) of 200° C. to 250° C.

The Invention also encompasses a process of coating a metal coil with the coating composition according to the invention. Such process comprises the steps of applying a primer coating to the metal surface, heating the metal coil to a peak metal temperature (PMT) of 200° C. to 250° C., applying the coating composition at a peak metal temperature (PMT) of 200° C. to 250° C. and holding the peak metal temperature until the coating composition is cured.

As compared to a standard coil coating, the particle-based coil coating composition according to the present invention possesses excellent dirt-pick-up resistance shown by means of natural weathering test (ASTM G7). Apart from the excellent dirt-pick-up resistance properties, the mechanical properties of the particle-based col coating, such as pencil hardness (ASTM D3363) are similar to that of the standard fluoropolymer coil coating.

Adding liquid hydrophobic additives as known in the art into these coatings did not improve the problem of poor dirt-pick-up properties. The use of liquid hydrophobic additives can increase the water contact angle but not necessarily the self cleaning properties. Even if there is a self-cleaning effect in coating compositions using liquid hydrophobic additives, the self cleaning effect does not last as liquid hydrophobic additives can leach away over time.

A superhydrophobic surface is highly water repellent and can render self-cleaning properties. The most common techniques to fabricate a superhydrophobic surface includes etching, lithography and sol-gel process. However, such a process is usually not scalable, it is expensive or it requires strict process control. Unlike other prior art techniques, the present invention focuses on a particle-based composition approach which is mechanically robust, scalable, and suitable for many industrial coating applications. This approach also shows that it is possible to achieve coating formulations with good self-cleaning performance, together with excellent mechanical and chemical resistance properties.

The self-cleaning properties of the particle based coil coating according to the invention results in less cleaning and maintenance required for the high-end fluoropolymer coil coating applications such as the exterior architectural coatings which indicates long term durability at lower cost. The structural surface also offers an alternative deep matte and haptic feels.

The present invention can be used in the high end con coating segment for exterior architectural coatings in which poor dirt-pick-up properties are still an existing problem that remained unsolved. Additionally, the particle-based coating concept may be applicable for other applications including industrial, transportation and decorative coatings to create structural surfaces with self-cleaning properties.

The prior arts focuses on creating a structural surface through the synthesized structural particles or multiple coating steps with different micro- and nanoparticles. The main disadvantages include additional process steps which can increase the overall cost of these formulations. Moreover, the high water contact angle or superhydrophobic properties do not last as it is known in the art that rough morphology has low robustness.

This coating composition according to the present invention provides a completely new technology for the coil coating industry to solve poor dirt-pick-up properties.

Examples

The particle-based coil coating formulation according to the invention was formulated with the contents given in Table 1. Additional solvent may be used to adjust the viscosity of the formulation to ease application of the coating.

TABLE 1

Components of the coating composition

| Component | Content |
|---|---|
| Polymeric binder | Fluoroethylene vinyl ether (FEVE) |
| Microparticle A | Polyamide 12/$d_{50}$ of 6 μm |
| Microparticle B | Polyamide 12/$d_{50}$ of 26 μm |
| Microparticle C | Polymethyl methacrylate/$d_{50}$ of 28 μm |
| Nanoparticle | Fumed Silica treated with polydimethylsiloxane, primary particle size 5 nm to 50 nm |
| Crosslinker | Blocked polyisocyanate |
| Pigment | Titanium dioxide |
| Solvent | Alkylbenzene |

The mean particle diameter $d_{50}$ was measured according to ISO 13320-1.

Nanoparticle size is given as primary particle size meaning not the size of agglomerated nanoparticles. Primary particle size was determined according to ISO 21363.

The coating process was performed under the following conditions:

A commercial polyester primer coating of thickness 7 to 10 μm was applied on an aluminium substrate for all the examples below under baking conditions with peak metal temperature (PMT) of 224° C.

The coating formulations as shown in Table 2 were coated on the primer coating under baking conditions with peak metal temperature (PMT) of 232° C. The final thickness of the particle-based coil coating layer was 25 to 35 μm.

TABLE 2

Contents of coating compositions 1 to 8

| Composition | 1 | 2 | 3 | 4 | 5 | 6 | 7 | 8 |
|---|---|---|---|---|---|---|---|---|
| Polymeric binder [% wt] | 23 | 9 | 9 | 10 | 5 | 8 | 10 | 10 |
| Crosslinker [% wt] | 7 | 2 | 2 | 3 | 1 | 3 | 3 | 3 |
| Pigment [% wt] | 10 | 4 | 4 | 4 | 2 | 3 | 4 | 3 |
| Microparticle A [% wt] | 0 | 28 | | | 36 | 25 | 31 | 0 |
| Microparticle B [% wt] | 0 | | 28 | | | | | 0 |
| Microparticle C [% wt] | 0 | | | 36 | | | | 0 |
| Nanoparticle [% wt] | 0 | 3 | 3 | 3 | 4 | 6 | 0 | 10 |
| Solvent [% wt] | 60 | 54 | 54 | 44 | 52 | 55 | 52 | 74 |

The weight percentages indicated for the polymeric binder refer to the binder solids. If micro- or nanoparticles are present in solvent the weight percentage refers to the solid content. Similarly, the weight percentage of crosslinker and pigment also refers to the solid content.

TABLE 3

Properties of coated compositions 1 to 8 after coating on aluminium substrates

| Properties of coated compositions | 1 | 2 | 3 | 4 | 5 | 6 | 7 |
|---|---|---|---|---|---|---|---|
| Water contact angle (°) | 92 | 130 | 135 | 140 | 134 | 145 | 93 |
| Thickness (μm) | 31 | 25 | 34 | 32 | 32 | 32 | 33 |
| MEK rub | 30 | >1000 | >1000 | 30 | >1000 | 938 | >1000 |
| Pencil hardness | 2 H | 2 H | 4 H | 4 H | 3 H | 3 H | 2 H |
| 3-months Natural exposure (−dL) | 12.0 | 2.9 | 3.8 | 2.9 | 1.4 | 2.6 | 10.6 |

Water contact angle was determined according to ASTM D7334.

Thickness of the coating was determined according to ASTM B244.

MEK rub test was carried out according to ASTM D7835.

Pencil hardness was determined according to ASTM D3383.

The 3 months natural exposure test was carried out according to ASTM G7.

Coating composition 1 serves as the control containing no microparticles and no nanoparticles. Coating compositions 2 to 6 contain various types and amounts of micro and nanoparticles according to the invention. Coating composition 7 is a comparative example containing only microparticles and no nano particles. Coating composition 8 containing only nanoparticles and no microparticles was found to be unsuitable for coating. The resulting coating layer was brittle, flaked off and the parameters as indicated in table 3 could not be measured.

The water contact angle of the coating using composition 1 without particles was 92° and therefore significantly lower than in compositions 2 to 6 according to the invention which range from 130° to 145°. The higher water contact angle indicates a higher hydrophobicity in the compositions according to the invention as compared with composition 1 without particles.

Coating composition 7 containing only microparticles and no nanoparticles showed a water contact angle similar to composition 1.

The thickness of coating compositions 2 to 6 according to the invention is in the same range as coating composition 1 without particles. The addition of particles to the coating composition does not make coatings with higher thickness necessary.

The MEK rub is a measure of the chemical resistance against solvents. It was tested using methyl ethyl ketone (MEK) according to ASTM D7835. The MEK rub values of the coated surfaces using coating compositions 2 to 8 according to the invention are either on the same level as coating composition 1 or—very surpassingly—the MEK rub values are drastically enhanced if the microparticles are polyamide 12 and in a mean particle size range d50 of 5 μm to 40 μm.

The pencil hardness indicates scratch resistance properties of the coating. The added particles in coating compositions 2 to 6 do not decrease scratch resistance. The scratch resistance of the samples coated with a composition according to the invention remains at the same level as coated composition 1 or becomes significantly better than coated composition 1.

3 months natural exposure –dL determines the change in brightness of a specimen coated with a white coating. Dirt that accumulates on the sample coating causes the coating to become darker. This can be measured by spectrophotometer according to ASTM G7. Higher –dL values indicate a higher dirt pick up. Accordingly lower –dL values show lower dirt pick-up. Visible dirt-pick up occurs in the area of –dL 8 to 9 or above.

It Is clear from the 3-months natural exposure results that coating compositions 2 to 6 possess better self-cleaning performance as compared to the control coating composition 1 without any particles or comparative coating composition 7 that comprises only microparticles and no nanoparticles. This surprising effect of lower dirt pick up is achieved while mechanical and chemical properties are retained or are even significantly improved.

Comparing the results of coating composition 1, 2 and 4 shows the effect of the types of microparticles on the properties of the coatings. Example 2 uses microparticle A made of polyamide 12 with a d50 of 6 μm and coating composition 4 contains microparticle C made of polymethyl methacrylate with a d50 of 28 μm. Both compositions 2 and 4 contained fumed silica nanoparticles treated with polydimethylsiloxane.

As shown in Table 3, coating composition 2 containing polyamide 12 microparticles and fumed silica nanoparticles shows a much higher contact angle as coating composition 1 without particles and also a much higher contact angle than coating composition 7 containing only microparticles and no nanoparticles. The water contact angle of coating composition 4 is even further enhanced and reaches 140° as compared to 92° for coating composition 1 and 93° for coating composition 7.

The 3-months natural exposure results illustrate that coating compositions 2 to 6 according to the invention show much better results in self-cleaning performance. Dirt marks are highly visible on coating composition 1 resulting in a much higher –dL value of 12.0 while coating compositions 2 to 6 remain relatively cleaner with a significantly lower –dL value in the area of 0.2 to 3.8. The self-cleaning performance of coating composition 2 containing PA12 microparticles and fumed silica nanoparticles is at the same level as coating composition 4 containing polymethylmethacrylate microparticles and fumed silica nanoparticles.

The nanoparticles that were used for coating compositions 2 to 6 consist of fumed silica functionalized with polydimethylsiloxane. Increasing the amount of such nanoparticles in the coating compositions may further increase the hydrophobicity of the coatings as can be seen from the water contact angle. By comparing examples 2, 5, and 6, it is apparent that the hydrophobicity increases as the ratio of microparticles to nanoparticles decreases. Coating composition 2 has a ratio of microparticles to nanoparticles of 9.3:1. Coating composition 5 has a ratio of 9:1. Coating composition 6 has a ratio of microparticles to nanoparticles of 4.2:1. Coating composition 6 shows the highest contact angle and lowest dirt pick-up among those four examples.

The chemical resistance based on MEK rub and the mechanical properties of the coating is significantly improved for coatings with microparticle A, which is the smallest among these microparticles. In addition, the natural exposure test results were significantly improved as compared to the control coating composition 1 or comparative coating composition 7 containing only microparticle A.

The invention claimed is:

1. A coating composition, comprising:
    a) 5-15% by weight of a polymeric binder selected from the group consisting of a polyester polyol, an acrylic polyol, an epoxy, a silicone, a silicone hybrid, and a fluoropolymer;
    b) 20-40% by weight of microparticles, wherein the microparticles are made of a polyamide, a polyethylene, a polypropylene, a polyurea, a polyurethane, a polymethyl methacrylate, a polystyrene, and mixtures thereof, wherein the microparticles have a mean particle diameter $d_{50}$ size ranging from 5 μm to 60 μm;
    c) 2-12% by weight of nanoparticles, wherein the nanoparticles are made of inorganic oxides with a primary particle size ranging from 5 nm to 50 nm;
    d) 0-15% by weight of a crosslinker having reactivity to component a);
    e) 0-20% by weight of pigments and/or fillers; and
    f) 40-60% by weight of an organic solvent, wherein the sum of components a) to f) of the composition equals 100% weight.

2. The coating composition according to claim 1, wherein component a) is selected from the group consisting of silicone, a silicone hybrid, and a fluoropolymer.

3. The coating composition according to claim 2, wherein component a) is selected from the group consisting of fluoroethylene vinyl ether (FEVE) and polyvinylidene fluoride (PVDF).

4. The coating composition according to claim 1, wherein component b) is made of polyamide or polymethyl methacrylate.

5. The coating composition according to claim 1, wherein component c) is made of $SiO_2$, $Al_2O_3$, MgO, $ZrO_2$, or ZnO.

6. The coating composition according to claim 5, wherein component c) is surface treated with a hydrophobic material selected from the group consisting of a polysiloxane, an alkyl silane, and a fluorinated alkyl silane.

7. The coating composition according to claim 6, wherein component c) is surface treated with a hydrophobic material selected from the group consisting of polydimethylsiloxane, dimethylchlorosilane, hexamethyldisilazane, octyltrimethoxysilane, and hexadecyltrimethoxysilane.

8. The coating composition according to claim 1, wherein a weight ratio of microparticles to nanoparticles is in a range of 15:1 to 3:1.

9. The coating composition according to claim 1, wherein component d) is present and is an amine, melamine or a blocked isocyanate.

10. The coating composition according to claim 3, wherein the coating composition is a coil coating composition.

11. The coating composition according to claim 10, wherein component a) is selected from the group consisting of fluoroethylene vinyl ether (FEVE) and polyvinylidene fluoride (PVDF), component b) is made of polyamide or polymethyl methacrylate, component c) is made of $SiO_2$ or $ZrO_2$ surface treated with a polysiloxane and component d) is a blocked isocyanate.

12. A method for coating metal coils at a peak metal temperature (PMT) of 200° C. to 250° C., the method comprising: applying the coating composition according to claim 10 to metal coils.

13. A process of coating a metal coil with the coating composition according to claim 10, the process comprising
applying a primer coating to the metal surface of a metal coil,
heating the metal coil to a peak metal temperature (PMT) of 200° C. to 250° C.,
applying the coating composition at the peak metal temperature (PMT) of 200° C. to 250° C. and
holding the PMT until the coating composition is cured on the metal coil.

14. The coating composition according to claim 1, wherein component a) is selected from the group consisting of fluoroethylene vinyl ether (FEVE) and polyvinylidene fluoride (PVDF), component b) is made of polyamide or polymethyl methacrylate, component c) is made of $SiO_2$ or $ZrO_2$ surface treated with a polysiloxane, and component d) is a blocked isocyanate.

15. The coating composition according to claim 1, wherein component c) is made of $SiO_2$ or $ZrO_2$ surface treated with a polysiloxane.

16. The coating composition according to claim 1, wherein component d) is a blocked isocyanate.

17. The coating composition according to claim 1, wherein component f) comprises alkyl benzene.

18. The coating composition according to claim 1, wherein component f) comprises naptha, alkyl benzene, isophorone, cyclohexanone, or glycol ether.

19. The coating composition according to claim 1, wherein component e) is present.

* * * * *